US010111297B2

(12) United States Patent
Ciccarelli et al.

(10) Patent No.: US 10,111,297 B2
(45) Date of Patent: Oct. 23, 2018

(54) DIGITAL CONTROL FOR LIGHTING FIXTURES

(71) Applicant: ABL IP Holding LLC, Atlanta, GA (US)

(72) Inventors: David Ciccarelli, Johns Creek, GA (US); Daniel Aaron Weiss, Tucker, GA (US); Ryan A. Zaveruha, Stratford, CT (US)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 15/846,635

(22) Filed: Dec. 19, 2017

(65) Prior Publication Data
US 2018/0124896 A1 May 3, 2018

Related U.S. Application Data

(63) Continuation of application No. 15/486,449, filed on Apr. 13, 2017, now Pat. No. 9,883,564.
(Continued)

(51) Int. Cl.
H01J 13/32 (2006.01)
H05B 33/08 (2006.01)
H05B 37/02 (2006.01)

(52) U.S. Cl.
CPC ..... *H05B 33/0872* (2013.01); *H05B 33/0854* (2013.01); *H05B 33/0857* (2013.01); *H05B 37/0218* (2013.01); *H05B 33/0863* (2013.01)

(58) Field of Classification Search
CPC ...... H01J 19/36; H01J 2893/0027; H01J 7/24; H01J 61/523; H01J 61/52; H01J 65/044;
(Continued)

(56) References Cited

U.S. PATENT DOCUMENTS 9,549,448 B2 1/2017 Pope et al.
9,655,194 B2 5/2017 Kumada et al.
(Continued)

FOREIGN PATENT DOCUMENTS

DE 102015109351 12/2015
EP 3232736 10/2007
(Continued)

OTHER PUBLICATIONS

Notice of Allowance for U.S. Appl. No. 15/486,449, dated Sep. 20, 2017, 10 pages.
(Continued)

*Primary Examiner* — Minh D A
(74) *Attorney, Agent, or Firm* — Kilpatrick Townsend & Stockton LLP

(57) ABSTRACT

A processing device can digitally control lighting fixtures by receiving a request to generate light at a correlated color temperature ("CCT") level in an environment. The environment can include a first lighting fixture having a first range of generatable CCT values and a second lighting fixture having a second range of generatable CCT values. The processing device can determine a first CCT value based on the request and the first range. The processing device can further determine a second CCT value based on the first CCT value and the second range. The processing device can further transmit a first digital signal to the first lighting fixture to cause the first lighting fixture to generate light at the first CCT value. The processing device can further transmit a second digital signal to the second lighting fixture to cause the second lighting fixture to generate light at the second CCT value.

23 Claims, 4 Drawing Sheets

Related U.S. Application Data

(60) Provisional application No. 62/323,149, filed on Apr. 15, 2016.

(58) Field of Classification Search
CPC ......... H01J 13/32; H04B 1/036; H02H 7/127; B23H 1/026; B60Q 11/005; G10H 1/00; G10H 1/32; F21K 9/00; F21V 29/004; F21V 25/10; F21V 25/04; H05B 41/36; H05B 41/00; H05B 33/0815; H05B 33/0818; H05B 41/2828; H05B 41/3921; H05B 41/3927; H05B 37/029; H05B 33/0803; H05B 37/0254; H05B 37/02
See application file for complete search history.

(56) References Cited

U.S. PATENT DOCUMENTS

| | | |
|---|---|---|
| 2012/0038291 A1 | 2/2012 | Hasnain |
| 2012/0235579 A1* | 9/2012 | Chemel .................. F21S 2/005 315/152 |
| 2013/0211608 A1* | 8/2013 | Farrell ...................... G06F 1/26 700/286 |
| 2015/0351169 A1* | 12/2015 | Pope .................... H05B 33/086 315/193 |
| 2016/0044753 A1 | 2/2016 | Lee |
| 2017/0303366 A1 | 10/2017 | Ciccarelli et al. |

FOREIGN PATENT DOCUMENTS

| | | |
|---|---|---|
| WO | 2007033667 | 3/2007 |
| WO | 2009072689 | 6/2009 |
| WO | 2009081382 | 7/2009 |
| WO | 2013011405 | 1/2013 |

OTHER PUBLICATIONS

Extended European Search Report for European Patent Application No. EP 17166664.7, dated Nov. 20, 2017, 11 pages.
CA 2,964,566, "Office Action," dated Mar. 5, 2018, 3 pages.

* cited by examiner

DIGITAL CONTROL FOR LIGHTING FIXTURES

CROSS REFERENCE TO RELATED APPLICATIONS

This application is a continuation of U.S. application Ser. No. 15/486,449, filed on Apr. 13, 2017, entitled "Digital Control for Lighting Fixtures," which claims priority to U.S. Provisional Application No. 62/323,149, filed on Apr. 15, 2016, entitled "Digital Control for Lighting Fixtures", the contents of which are both hereby incorporated by reference.

TECHNICAL FIELD

The present disclosure relates generally to controlling lighting fixtures. More specifically, but not by way of limitation, this disclosure relates to digital control for lighting fixtures.

BACKGROUND

Some lighting fixtures output light within a range of color temperatures. The color temperature of light is a characteristic of visible light that corresponds to the temperature of an ideal black-body radiator that radiates light of comparable color. Different lighting fixtures can have different ranges of generatable color temperatures. When analog control is used to control lighting fixtures with different color temperature ranges, the light output may not be consistent between the fixtures. For example, instructing multiple lighting fixtures with different color temperature ranges to produce light at a percentage value results in the lighting fixtures generating light with different color temperatures since the lighting fixtures have different ranges. Furthermore, the analog controls may limit the precision of changes in the color temperature or other light characteristics.

SUMMARY

The present disclosure describes system and method of digital control for lighting fixtures. In some aspects, a system for digital control for lighting fixtures can include a first lighting fixture, a second lighting fixture, and a processing device. In additional or alternative aspects, processing device can be distributed among a first light manager associated with the first lighting fixture and a second manager associated with the second lighting fixture. The first lighting fixture can have a first range of generatable correlated color temperature ("CCT") values with a first minimum CCT value and a first maximum CCT value. The second lighting fixture can have a second range of generatable CCT values with a second minimum CCT value and a second maximum CCT value. The processing device can be communicatively coupled to the first lighting fixture and the second lighting fixture and configured to receive a request to generate light at a CCT level. The CCT level can be between the first minimum CCT value and the second minimum CCT value or between the first maximum CCT value and the second maximum CCT value. In some aspects, the system can included a user interface for generating the request based on user input. In additional or alternative aspects, the system can include one or more sensors for generating the request based on environmental conditions measured by the sensors.

The processing device can determine a first CCT value based on the request and the first range. The processing device can further determine a second CCT value based on the first CCT value and the second range. The processing device can transmit a first digital signal to the first lighting fixture to cause the first lighting fixture to generate light at the first CCT value. The processing device can further transmit a second digital signal to the second lighting fixture to cause the second lighting fixture to generate light at the second CCT value.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Certain aspects and features relate to digital control for lighting fixtures. In some examples, the intensity and the correlated color temperature ("CCT") of lighting fixtures can be digitally controlled. The light emitted by the lighting fixtures can be controlled by a central processing device, distributed light managers, or any combination thereof. The central processing device or the distributed light managers perform fully automatic sensor-driven operations, scheduled operations, and/or user-triggered operations for adjusting the intensity and the CCT of the lighting fixtures. In some aspects, digitally controlling the lighting fixtures can result in higher accuracy than analog signaling. In additional or alternative aspects, a wide range of possible operating modes can be implemented using digital control by combining automatic operations, scheduled operations, and user-triggered operations.

These illustrative examples are provided to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
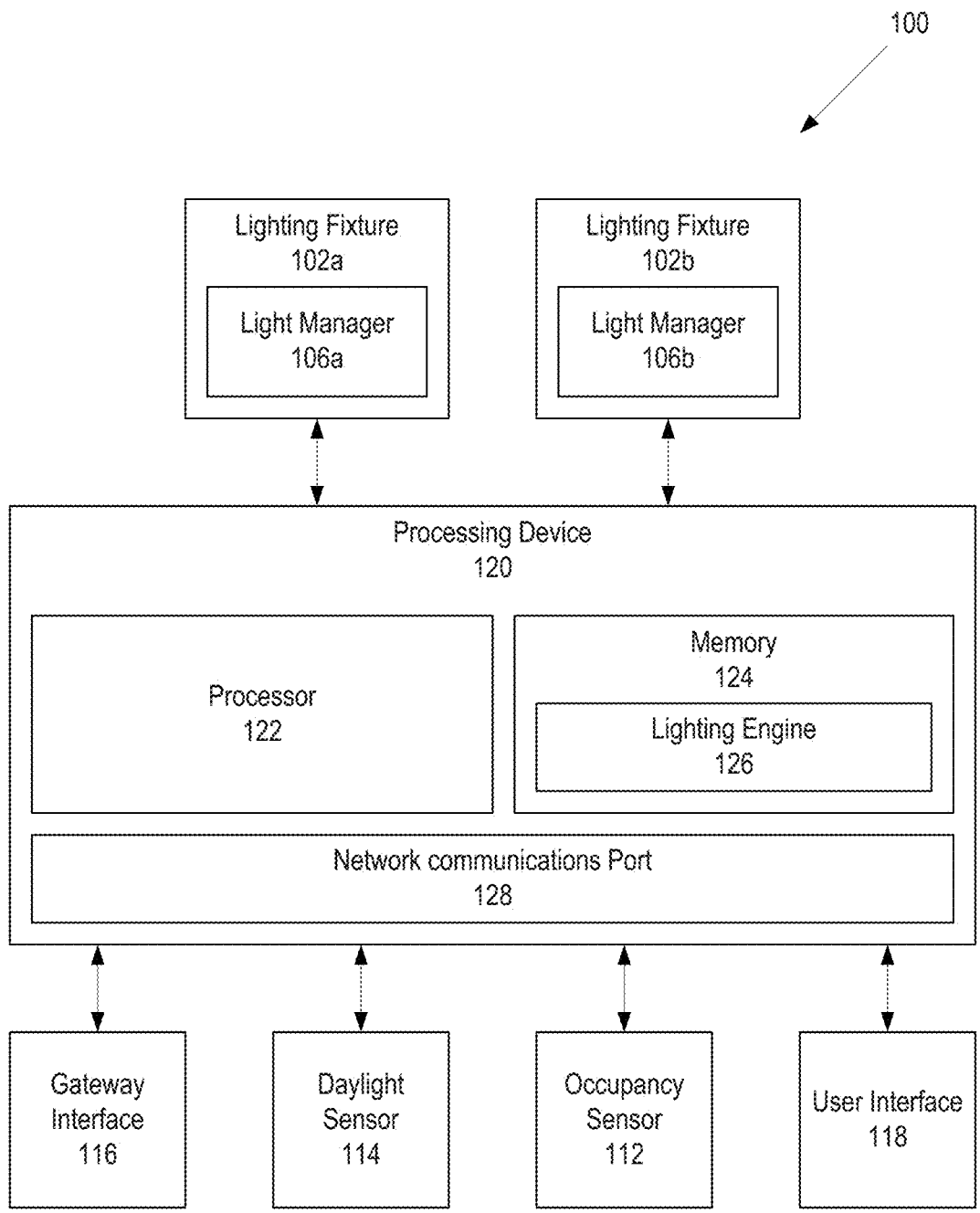
FIG. 1 is a block diagram of an example of an environment with lighting fixtures digitally controlled by a central processing device according to one aspect of the present disclosure.

FIG. 1 is a block diagram of an example of an environment 100 that includes lighting fixtures 102a-b, processing device 120, an occupancy sensor 112, a daylight sensor 114 (e.g., a photodiode), a gateway interface 116, and a user interface 118.

The lighting fixtures 102*a-b* can include one or more illuminating elements, a driver, and/or other possible components. Each illuminating element may be an LED, an OLED, a tunable fluorescent lamp, and/or other possible light emitting device(s) in which the color temperature, color of light, or other lighting characteristic emitted from the lighting fixture may be altered. Each of the lighting fixtures 102*a-b* can have the same or different lighting characteristics. The driver directs the one or more illuminating elements of the light fixtures 102*a-b* to produce the desired CCT, intensity and/or color as indicated by a digital signal received by the light manager. In some examples, the light manager generates a digital light control signal based on the LEDcode protocol and sends the digital light control signal to the driver. In additional or alternative examples, other digital lighting control protocols may be used to communicate with the driver of the lighting fixtures 102*a-b* such as nLight, DMX, or DALI.

The light managers 106*a-b* may be used to determine ranges of CCT values that can be generated by each lighting fixture 102*a-b*. For example, lighting fixture 102*a* may support a CCT range of 3000K to 5000K and lighting fixture 102*b* may support a CCT range of 2500K to 6500K. Each of the light managers 106*a-b* may receive the CCT range information from the driver or other component in its associated lighting fixture 102*a-b* or through an installation or configuration process.

In some aspects, the light managers 106*a-b* can be communicatively coupled to the processing device 120 for receiving digital signals with instructions for causing their associated lighting fixtures 102*a-b* to generate light with a determined CCT value. In additional or alternative aspects, the light managers 106*a-b* can transmit digital signals with information on the CCT range or other lighting characteristics of their associated lighting fixtures 102*a-b*.

The processing device 120 can include any number of processors 122 configured for executing program code stored in memory 124. Examples of the processing device 120 include a microprocessor, an application-specific integrated circuit ("ASIC"), a field-programmable gate array ("FPGA"), or another suitable processor. In some examples, the processing device 120 is a dedicated processing device used for digitally controlling lighting fixtures 102*a-b*. In additional or alternative examples, the processing device 120 manages the user interface 118 and monitors the sensors 112, 114.

The processing device 120 can include a network communications port 128 for communicatively coupling to other devices in the environment 100. The network communications port may use the same or a different protocol to communicate with the light managers 106*a-b* as it uses to communicate with the occupancy sensor 112, daylight sensor 114, gateway interface 116 and the user interface 118.

The processing device 120 may receive information on the CCT ranges or other light characteristics supported by each of the lighting fixtures from the light managers or via a configuration process. The processing device may generate a user interface with options based on the received information. For example, if lighting fixture 102*a* supports a CCT range of 3000K to 5000K and lighting fixture 102*b* supports a CCT range of 2500K to 6500K, then the processing device may generate a user interface that presents a CCT range of 2500K to 6500K (e.g., a superset of the ranges) or the processing device may generate a user interface that presents a CCT range of 3000K to 5000K (e.g., a shared range).

The processing device 120 can include (or be communicatively coupled with) a non-transitory computer-readable medium 124. The memory 124 can include on or more memory devices that can store program instructions. The program instructions can include for example a lighting engine 126.

The lighting engine 126 according to this disclosure may be executable by the processing device 120 to perform certain operations, such as digitally controlling the lighting fixtures 102*a-b*. In some examples, the processing device 120 receives a request for a CCT level or an intensity level to be generated in the environment 100. The request can be based on a programmed configuration and input received from various sensors and control interfaces that may be located nearby or remote from the lighting fixtures 102*a-b*.

The processing device 120 can compare a requested or a determined CCT level with generatable CCT values for each lighting fixture 102*a-b* to determine a digital signal to transmit to each lighting fixture 102*a-b* to cause the lighting fixture 102*a-b* to output light with a determined CCT value. For example, if the user selects a CCT value of 3200K, then the processing device sends digital signals to light managers 106*a-b* instructing the light managers 106*a-b* to generate light with a CCT value of 3200K. Using a digital signal allows the processing device to accurately control each of the lighting fixtures 102*a-b* to produce light with the requested CCT value even though the lighting fixtures 102*a-b* may support different CCT ranges.

In some aspects, the processing device 120 instructs the lighting fixtures 102*a-b* to generate a light having a maximum CCT value if the requested CCT level is higher than the maximum CCT value or a minimum CCT value if the requested CCT level is below the minimum CCT value. For example, if the user selects a CCT value of 2700K, the processing device 120 can transmit a digital signal to light manager 106*a* instructing the light manager 106*a* to generate light with a CCT value of 3000K, which can be the minimum CCT value supported by the lighting fixture 102*a* and as close to the requested CCT as possible. The processing device 120 can also transmit a digital signal to light manager 106*b* instructing light manager 106*b* to generate light with a CCT value of 2700K since the requested CCT value is within the CCT range of lighting fixture 102*b*.

In additional or alternative aspects, the processing device 120 can instruct one of the lighting fixtures 102*a-b* to generate a light based on the requested CCT level and the range of CCT values generatable by the other lighting fixture 102*a-b*. In some examples, the processing device 120 can instruct the lighting fixtures 102*a-b* to generate light at the closest CCT value to the requested CCT level that all lighting fixtures 102*a-b* can generate. For example, if the user selects a CCT value of 2700K, the processing device 120 can instruct light managers 106*a-b* to each generate light from their associated lighting fixtures 102*a-b* with a CCT value of 3000K if the requested CCT value of 2700K is below the range of lighting fixture 102*a* even if 3000K is within the range of lighting fixture 102*b*. Requesting the lighting fixtures 102*a-b* generate light with a CCT value within the range of other lighting fixtures 102*a-b* can produce a more uniform CCT value in an environment.

In additional or alternative examples, the processing device 120 can instruct one of the lighting fixtures 102*a-b* to generate light with a CCT value above or below the requested CCT level based on the other one of the lighting fixtures 102*a-b* having a maximum below or a minimum above the requested CCT level. The light from one of the lighting fixtures 102a-b can be combined with light from one of the other lighting fixtures 102a-b to produce light having a CCT value substantially similar to the requested CCT level or more similar to the requested CCT level than the CCT value of light produced by one of the lighting fixtures 102a-b. For example, if the user selects a CCT value of 2700K, the processing device 120 can transmit a digital signal to light manager 106a instructing the light manager 106a to generate light with a CCT value of 3000K, which can be the minimum CCT value supported by the lighting fixture 102a and as close to the requested CCT as possible. The processing device 120 can also transmit a digital signal to light manager 106b instructing light manager 106b to generate light with a CCT value of 2500K to compensate for some of the difference between the CCT value of the light generated by the lighting fixture 102a and the requested CCT level.

In some examples, the daylight sensor 114 can detect light conditions associated with a sunrise or a sunset and notify the processing device 120. The processing device 120 can execute a dynamic transition to a specified color or intensity over a configurable amount of time based on the daylight sensor 114 detecting the sunrise or the sunset. In additional or alternative examples, the daylight sensor 114 can detect light conditions associated with solar time and transmit solar time information to the processing device 120. The processing device 120 can execute dynamic transitions to color setpoints or intensities at predetermined solar times.

In additional or alternative examples, the processing device 120 can instruct the lighting fixtures 102a-b to change a CCT value from a predetermined standby color to an active color in response to receiving a signal from the occupancy sensor 112 indicating the environment 100 is occupied. In additional or alternative examples, the processing device 120 can instruct the lighting fixtures 102a-b to dynamically transition a CCT value or an intensity value based on a number of occupants in the environment 100 or an activity level of the occupants in the environment 100 as measured by the occupancy sensor 112.

In some aspects, the gateway interface 116 can enable an interface through which various devices in the environment 100 (e.g., the light managers 106a-b, sensors 112, 114, and processing device 120) can be configured. In some example, the gateway interface 116 can enable configuring the processing device 120 to be associated with the daylight sensor 114 and occupancy sensor 112 (and potentially other devices). In additional or alternative examples, the gateway interface 116 can enable configuring a scheduled response by the processing device 120 to input from the sensors 112, 114. The gateway interface 116 can enable a user, a sensor, or another lighting system to adjust how the processing device 120 handles requested CCT levels that are outside the generatable range of one of the lighting fixtures 102a-b.

In additional or alternative aspects, the gateway interface 116 can monitor the status of the lighting system. In some examples, the gateway interface 116 can monitor and record the current CCT value being output by each of the lighting fixtures 102a-b. In additional or alternative examples, the gateway interface 116 can monitor and record the CCT value requested to be output from each of the lighting fixtures 102a-b.

In additional or alternative aspects, the gateway interface 116 can communicatively couple the processing device 120 to other networks or computing devices. In some examples, the processing device 120 can receive requests to adjust the CCT level in the environment 100 from other components via the gateway interface 116. The gateway interface 116 can communicatively couple the processing device 120 to a computing device for controlling lighting fixtures in another environment (e.g., a room adjacent to the environment 100). The processing device 120 can receive digital signals from the computing device indicting the CCT level of the other environment. Then the processing device 120 can transmit instructions to the lighting fixtures 102a-b to adjust the CCT level in the environment 100 to be substantially similar to the CCT level in the other environment. In additional or alternative examples, the processing device 120 can also receive instructions via the gateway interface 116 that can be stored in memory 124 and executed based on the processing device 120 receiving a digital signal from the occupancy sensor 112, daylight sensor 114, or the user interface 118.

Although FIG. 1 depicts the light managers 106a-b as embedded in the lighting fixtures 102a-c, the light managers 106a-b can be independent components or included in other devices in the environment 100. In some aspects, more than two lighting fixtures 102a-b can be included in the environment 100. In additional or alternative aspects, additional sensors can provide input to the processing device 120 for requesting a change in the CCT level of the environment.

Figure 2:
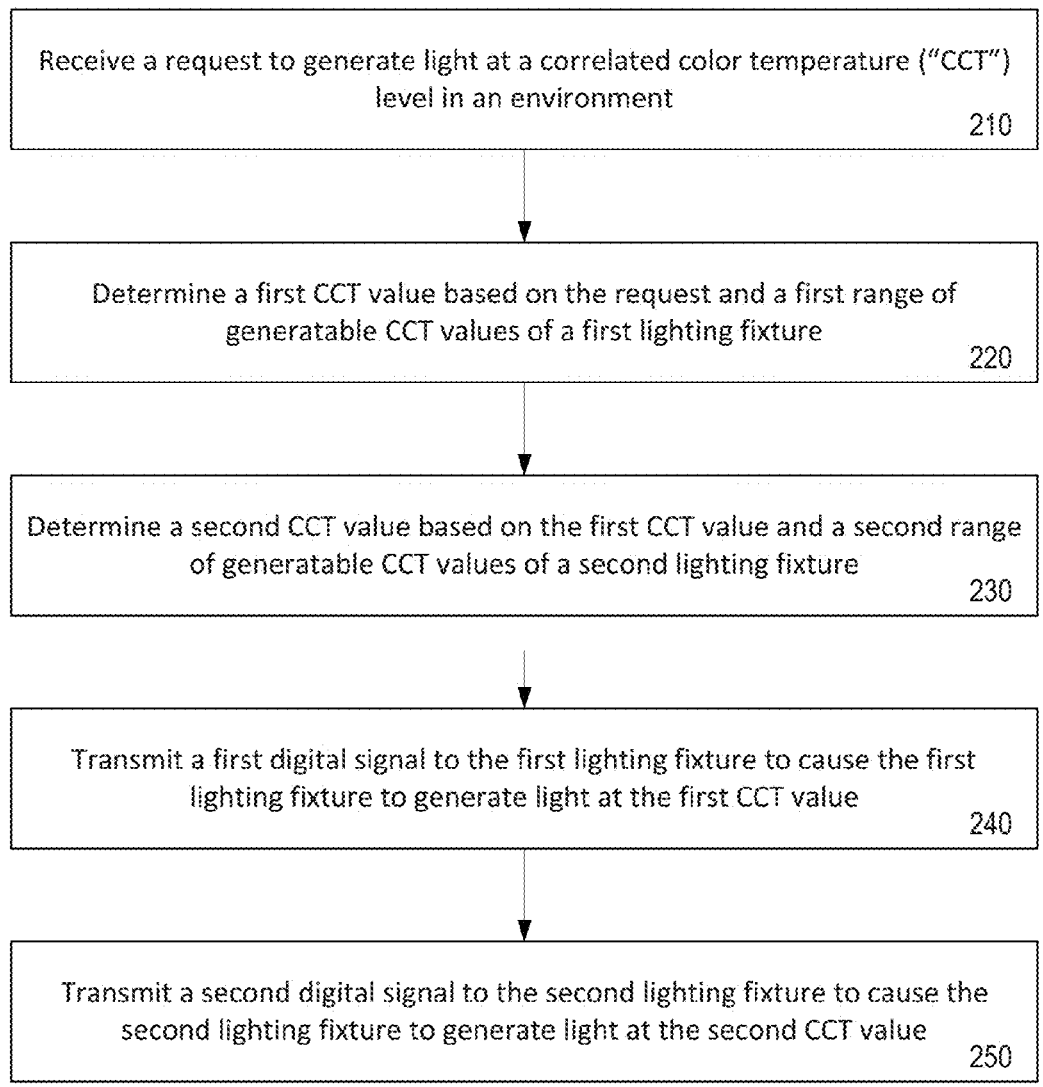
FIG. 2 is a flow chart of an example of a process for digitally controlling lighting fixtures with a central processing device according to one aspect of the present disclosure.

FIG. 2 is a flow chart of an example of a process for digitally controlling lighting fixtures with a central processing device 120. The description of FIG. 2 will be made with respect to the block diagram shown in FIG. 1; however, it should be appreciated that any suitable lighting system according to this disclosure may be employed.

In block 210, the processing device 120 receives a request to generate light at a CCT level in the environment 100. The environment 100 includes the first lighting fixture 102a and the second lighting fixture 102b. The first lighting fixture 102a can have a first range of generatable CCT values with a first minimum CCT value and a first maximum CCT value. The second lighting fixture 102b can have a second range of generatable CCT values having a second minimum CCT value and a second maximum CCT value. The CCT level requested can be within both ranges, within only one range, or within neither range. For example, when the lighting fixtures have different ranges, the CCT level can be in one range by being between the minimum CCT values for the lighting fixtures or between the maximum CCT values for the lighting fixtures.

In some aspects, the request to generate the light at the CCT level can be received from the user interface 118. In some examples, a user selects the CCT level from a set of potential CCT values displayed by the user interface 118 and the user interface 118 transmits the selection to the processing device 120. In additional or alternative examples, the user requests an adjustment (e.g., an increase or a decrease) in the CCT level of the environment 100.

In additional or alternative aspects, the request to generate the light at the CCT level can be based, at least in part, on a condition detected by a sensor (e.g., the occupancy sensor 112, the daylight sensor 114, or the gateway interface 116). In some examples, the sensor can transmit information on the sensed condition to the central processing device and the central processing device determines the CCT level. In other example, the sensor can transmit a signal specifying a CCT level or triggering a CCT adjustment.

In block 220, the processing device 120 determines a first CCT value based on the request and the first range of the first lighting fixture 102a. The first CCT level can be above, below, or within the generatable range of the first lighting fixture 102a. In some examples, the processing device 120 determines the first CCT value to be the requested CCT level in response to determining the requested CCT level is within the generatable range of the first lighting fixture 102a. In additional or alternative examples, the processing device 120 determines the first CCT value to be the closest generatable CCT value to the requested CCT level.

In block 230, the processing device 120 determines a second CCT value based on the first CCT value and the second range of the second lighting fixture 102b. In some aspects, the processing device 120 determines the second CCT value to be substantially the same as the first CCT value based on determining the first CCT value is within the second range of the second lighting fixture 102b. Selecting a second CCT value that is substantially similar to the first CCT value can cause the lighting fixtures 102a-b to generate a uniform CCT value in the environment 100. In additional or alternative aspects, the processing device 120 can determine the second CCT value to be above the requested CCT level in response to the first CCT value being below the requested CCT level such that a combination of the light at the first CCT value and light at the second CCT value will form light with CCT value substantially similar to the requested CCT level. In additional or alternative aspects, the processing device 120 can determine the second CCT value to be below the requested CCT level in response to the first CCT value being above the requested CCT level such that a combination of the light at the first CCT value and light at the second CCT value will form light with a CCT value substantially similar to the requested CCT level. In additional or alternative aspects, the processing device 120 can determine the second CCT value to be the closest generatable CCT value to the requested CCT level.

In block 240, the processing device 120 transmits a first digital signal to the first lighting fixture 102a to cause the first lighting fixture 102a to generate light at the first CCT value. In block 250, the processing device 120 transmits a second digital signal to the second lighting fixture 102b to cause the second lighting fixture 102b to generate light at the second CCT value. The processing device 120 can transmit the digital signals over a wired or a wireless network. In some aspects the digital signals are transmitted to the lighting fixtures 102a-b via the light managers 106a-b. The first digital signal can include instructions specific to the first lighting fixture 102a for causing the first lighting fixture 102a to generate light at the first CCT value, which may differ from the instruction included in the second digital signal for causing the second lighting fixture 102b to generate light at the second CCT value.

Although FIG. 2 illustrates that the second CCT value is based on the first CCT value and the second range of generatable CCT values, the second CCT value may be determined independently of the first CCT value.

Although FIG. 2 depicts a process for digitally controlling a CCT value of lighting fixtures 102a-b, other characteristics can be digitally controlled using a similar process. For example, an intensity of lighting fixtures 102a-b can be controlled by the processing device 120. The processing device 120 can receive a request to generate light at an intensity level in the environment 100. The first lighting fixture 102a can have a range of generatable intensity values with a minimum intensity and a maximum intensity. The second lighting fixture 102b can have a range of generatable intensity values with a minimum intensity and a maximum intensity. The intensity level requested may be within one of the ranges. The processing device 120 can determine a first intensity value based on the request and an intensity range of the first lighting fixture 102a. The processing device 120 can determine a second intensity value based on the first intensity value and the intensity range of the second lighting fixture 102b. The processing device 120 can transmit instructions for causing the lighting fixtures 102a-b to generate light having the first intensity value and the second intensity value respectively as part of the first digital signal and the second digital signal.

Figure 3:
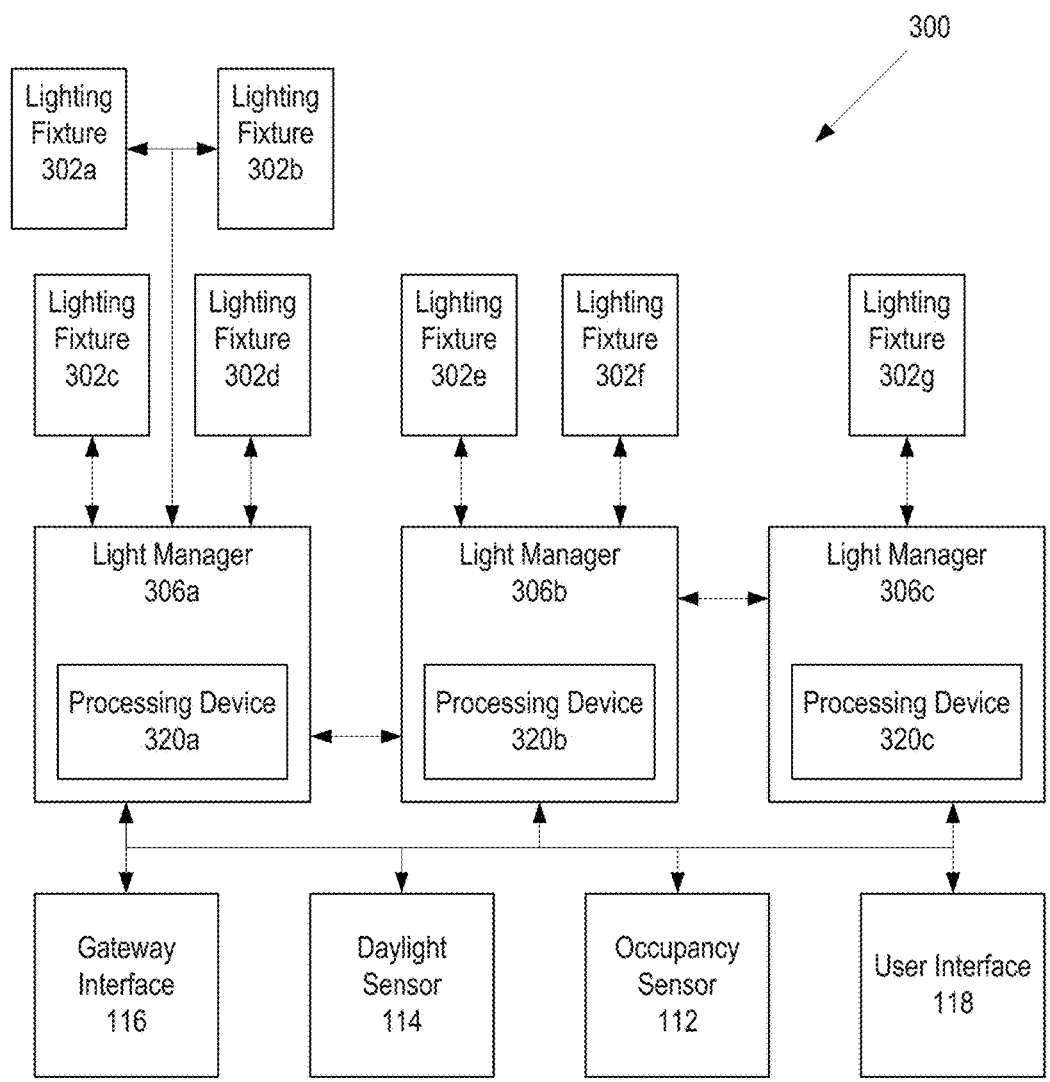
FIG. 3 is a block diagram of an example of an environment with lighting fixtures digitally controlled by a distributed network of light managers according to one aspect of the present disclosure.

FIG. 3 is a block diagram of an example of an environment 300 that includes digitally controlled lighting fixtures 302a-g, light managers 306a-c, an occupancy sensor 112, a daylight sensor 114, a gateway interface 116, and a user interface 118. Each of the light managers 306a-c includes a processing device 320a-c to provide distributed digital control of the lighting fixtures 302a-g. The processing devices 320a-c can each include similar features to the processing device 120 in FIG. 1 including a network communications port, a processor, and a memory with a lighting engine stored therein. The light managers 306a-c can each be communicatively coupled to one or more of the lighting fixtures 302a-g, and the light managers 306a-c can provide distributed intelligence for digital control of the lighting fixtures 302a-g. In some aspects, the user interface 118 can receive user input related to a requested color temperature or an intensity of light in the environment 300. The user interface 118 can be communicatively coupled to each of the light managers 306a-c and can communicate digital data based on the user input to each of the light managers 306a-c using a digital signal based on the nLight protocol. The light managers 306a-c can determine a range of generatable intensities or CCT values for an associated set of lighting fixtures 302a-g and can transmit instructions to the lighting fixtures 302a-g in the set to generate light with a CCT value within the range based on the digital data. For example, the instructions can be transmitted to a driver in each of the lighting fixtures 302a-g in the set using a digital signal based on the LEDcode protocol. The driver in each of the lighting fixtures 302a-g can output current to two strings of warm/cool LEDs to generate light with a CCT value based on the instructions.

In some aspects, the light managers 306a-c can receive a digital input signal from a daylight sensor 114. The daylight sensor 114 can measure the intensity, the color, or color temperature of ambient light, such as the daylight entering the environment 300 through a window. The daylight sensor 114 can report the measurement to the lighting managers 306a-c and other possible devices. Based on the input received from the daylight sensor 114, the lighting managers 306a-c can adjust the light output of the lighting fixture 302a-g. For example, the lighting managers 306a-c may be programmed to adjust the CCT and/or intensity level or turn off the lighting elements for the lighting fixtures 302a-g when the detected light characteristic exceeds a threshold amount (e.g., during daylight), or to adjust the CCT and/or intensity or turn on the lighting elements when the detected light characteristics are below a threshold amount (e.g., during evening).

In additional or alternative aspects, the lighting managers 306a-c can receive a digital input signal from an occupancy sensor 112 or other type of proximity sensor. The occupancy sensor 112 can sense the presence of people within an area proximate to the occupancy sensor 112, then report the measurement to the lighting managers 306a-c and other possible devices. The occupancy sensor 112 can be implemented using one or more of infrared ("IR") sensing, ultrasonic sensing, microwave sensing, MEMS sensing, microphonic sensing, and image-based sensing to detect the presence of people and possibly additional information, such as an occupancy count, density, and particular locations of the detections. For example, the lighting managers 306a-c may be programmed to set the light output from the lighting fixtures 302a-g at 100% intensity when ambient light level falls below a threshold (e.g. during the evening). However, using the occupancy sensor 112, the lighting managers 306a-c may reduce the light output level (i.e. dim level) to 50% intensity if no occupants have been detected in the vicinity of the lighting fixtures 302a-g for a timeout period, such as one hour. If an occupant is detected, the light output may return to the 100% output level, where it may stay until the timeout period is again exceeded.

The lighting managers 306a-c may further be programmed with criteria for which the occupancy sensing functionality is enabled or disabled, different timeout periods, different actions to be undertaken, etc. For example, the occupancy sensing functionality may be disabled from 6 A.M.-10 P.M. such that the light output level is at 100% if it is 'on.' From 10 P.M.-6 A.M., the light output level may be modified by the occupancy sensor 112 to a programmed level based on the detected occupancy of the area.

In additional or alternative aspects, the light managers 306a-c can receive a digital input signal from a temperature sensor (not shown). Based on input received from the temperature sensor, the lighting managers 306a-c may provide temperature protection functionality for the lighting fixtures 302a-g. When the lighting element of the lighting fixtures 302a-g is operating in extreme temperatures, such as experienced in outdoor locations, the longevity of the lighting element of the lighting fixtures 302a-g may be reduced. In these environments, the lifetime of the lighting element may be extended by adjusting the light output during these temperature extremes. To this end, the light managers 306a-c may include or be in communication with a temperature sensor that measures the temperature of the lighting fixtures 302a-g or the ambient air temperature. Such a sensor may be implemented using, for example, a thermistor. The light managers 306a-c may be programmed to initiate a particular action based upon the detected temperature meeting or exceeding a predetermined threshold. The light manager 306a-c may be further programmed to initiate additional actions if the temperature of the lighting fixtures 302a-g fails to respond to the previous actions.

For example, the light manager 306a-c may be configured to reduce the light output from the lighting fixtures 302a-g to no more than 50% of the maximum light output if the temperature of the lighting fixtures 302a-g exceeds 120° F. The programming of the light managers 306a-c may further reduce the light output from the lighting fixtures 302a-g to no more than 25% of the maximum light output if the temperature of the lighting fixtures 302a-g remains above 120° F. for five minutes after the previous action.

In some aspects, the light managers 306a-c can receive a digital input signal from a user interface 118 that may include one or more tactile buttons or a display such as a liquid crystal display ("LCD"), LED display, organic LED ("OLED") display, or other types of display devices. Based on input received from the user interface 118, the light managers 306a-c may adjust the lighting output from the lighting fixtures 302a-g to be based on a manually specified or preconfigured setting rather than the lighting output being based solely on sensor input or a schedule. For example, the user interface 118 can enable functionality for adjusting the light output by: turning the light output on or off, adjusting the dimming level, adjusting the color or color temperature, selecting predefined lighting profiles or configurations, etc. The commands received from the user interface 118 may be effective for a predefined time period or until occurrence of an event, such as the amount of light reaching a threshold or another command being received.

In additional or alternative aspects, the light managers 306a-c can receive a digital input signal from a gateway interface 116 that directs the light managers 306a-c to adjust light output from the lighting fixtures 302a-g. The gateway interface 116 can issue the direction to the light managers 306a-c based on predefined profiles for lighting behavior, such as specifying intensity and/or color temperature values based on time. For example, these time-based color temperature values can be a simple specification, such as one color temperature value in the morning and a different color temperature value for use in the afternoon, or they may be a more complex "path" of color temperature values over a period of time, such as mimicking the color temperature values of sunlight over the course of an ideal sunny day.

In addition to being a source of direction for light output, the gateway interface 116 can enable an interface through which various devices in the environment 100 (e.g., the light managers 306a-c, sensors, and controls) can be configured. For example, the gateway interface 116 can enable configuring the light managers 306a-c to be associated with the daylight sensor 114 and occupancy sensor 112 (and potentially other devices), as well as lighting fixture adjustment behavior of the light managers 306a-c based on the input from the sensors. For example, the lighting fixture adjustment behavior can include periods during which sensor input is enabled or disabled, timeout periods, the actions undertaken in response to particular sensor inputs, etc.

The gateway interface 116 can enable configuration of these devices through use of touch-sensitive displays, as well as network-based interfaces (e.g., web, application programming interface ("API"), etc.) that are operable over wired (e.g., Ethernet) and/or wireless networks (e.g., Wi-Fi). The network communication session may be carried out using various protocols such as, for example, hypertext transfer protocol ("HTTP"), simple object access protocol ("SOAP"), representational state transfer ("REST"), user datagram protocol ("UDP"), transmission control protocol ("TCP"), or other protocols for communicating data over the network. In some implementations, users are authenticated to the gateway interface 116 using one or more user credentials.

Figure 4:
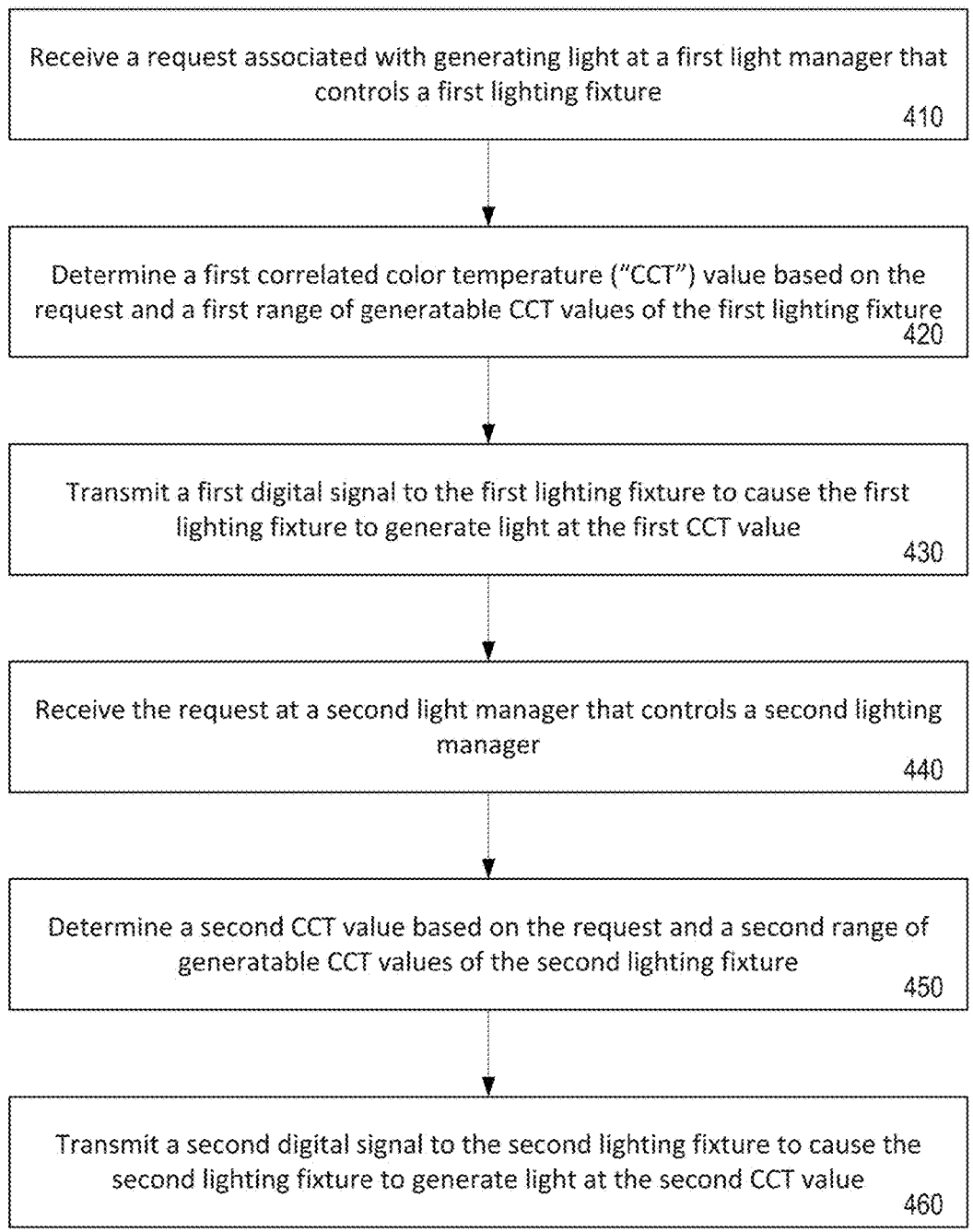
FIG. 4 is a flow chart of an example of a process for digitally controlling lighting fixtures with a distributed network of light managers according to one aspect of the present disclosure.

FIG. 4 is a flow chart of an example process for digitally controlling lighting fixtures with a distributed network of light managers. The description of FIG. 4 will be made with respect to the block diagram shown in FIG. 3; however, it should be appreciated that any suitable lighting system according to this disclosure may be employed.

In block 410, a first light manager 306a receives a request (e.g., user input or sensor data) associated with generating light with a first lighting fixture 302a. The first light manager 306a can receive the request from a user via the user interface 118 or can receive the request from one of the sensors 112, 114. The first light manager 306a can be communicatively coupled to the first lighting fixture 302a that may be able to generate light within a first range of CCT values. In some aspects, the request can be associated with generating light at a CCT level that is outside of the first range. In additional or alternative aspects, the first light manager 306a may control additional lighting fixtures 302b-d with different ranges of CCT values. The first light manager 306a may determine the greatest minimum and lowest maximum CCT value of the lighting fixtures 302a-d associated with the first light manager 306a. The first light manager 306a may provide the greatest minimum and the lowest maximum CCT values to the user interface 118 to restrict the options presented to users.

In block 420, the first light manager 306a determines a first CCT value based on the request and the first range of the first lighting fixture 302a. In some examples, the light manager 306a can determine the first CCT value is a requested CCT level based on the requested CCT level being within the first range. In additional or alternative examples, the light manager 306a can determine the first CCT value to be the closest generatable CCT value in the first range to the requested CCT level. In additional or alternative examples, the light manager 306a can determine the requested CCT level based on sensor data from one or more sensors.

In block 430, the first light manager 306a transmits a first digital signal to the first lighting fixture 302a to generate light at the first CCT value. The first light manager 306a can communicate the first digital signal using LEDcode protocol. In block 440, a second light manager 306b, that controls a second lighting fixture 302e, receives the request. The second light manager 306b can control a separate set of the lighting fixtures 302a-g than the first light manager 306a. The second light manager 306b can receive the same request as the first light manager 306a. In block 450, the second light manager 306b determines a second CCT value based on the request and the second range of the second lighting fixture 302e. The second light manager 306b can determine a second CCT value that is different from the first CCT value based on the second range of the second lighting fixture 302e. In block 460, the second light manager 306b transmits a second digital signal to the second lighting fixture 302e to generate light at the second CCT value. The second digital signal can be independent from the first digital signal such that the lighting fixtures 302a-g are digitally controlled by distributed light managers 306a-c.

The light managers 306a-b may communicate with each other so that one of the light managers 306a-b may control its associated lighting fixtures 302a-g based, in part, on the ranges supported by other lighting fixtures 302a-g or on the values set by other light managers 306a-b. For example, if the lighting fixtures 302a-g have different CCT ranges, each of the light managers 306a-b may communicate information about the CCT range of its associated lighting fixture(s) 306a-g. The light managers may control their associated lighting fixtures 306a-g to a CCT values common to all the lighting fixtures 306a-g.

The control of the lighting fixtures may be centralized in a central processing device 120, such as that illustrated in FIG. 1, or may be distributed across multiple devices or components, such as the light managers 306a-c illustrated in FIG. 3. Other control distributions are possible. For example, control could be distributed across a central processing device and multiple light managers or across a central processing device, light managers, and sensing devices.

In some aspects, a digital control system as described above may provide out of the box functionality since the components may be configured to initially communicate using a default channel. In some examples, a central processing device may include a network communications port that initially searches for sensors, interfaces, and lighting fixtures in an environment within a range of wireless communication of the processing device. In additional or alternative examples, the network communications port may cycle through a series of communication channels to detect various components in the environment. In additional or alternative aspects, the digital control system can analyze existing lighting fixtures to determine the available range of CCT values generatable by the existing lighting fixtures. The digital control system can analyze existing interfaces and sensors to determine a requested CCT level for the environment and include a default lighting engine for adjusting the CCT level in an environment to more accurately match the requested CCT level.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A method comprising:
   receiving, by a processing device, a request to generate light at a correlated color temperature ("CCT") level in an environment that includes:
   a first lighting fixture having a first range of generatable CCT values with a first minimum CCT value and a first maximum CCT value; and
   a second lighting fixture having a second range of generatable CCT values with a second minimum CCT value and a second maximum CCT value;
   when the CCT level is below the first minimum CCT value, then transmitting, by the processing device, a first digital signal to the first lighting fixture to cause the first lighting fixture to generate light at the first minimum CCT value, and transmitting, by the processing device, a second digital signal to the second lighting fixture to cause the second lighting fixture to generate light at a second CCT value based on the CCT level and the first minimum CCT value; and
   when the CCT level is above the first maximum CCT value, then transmitting, by the processing device, a first digital signal to the first lighting fixture to cause the first lighting fixture to generate light at the first maximum CCT value, and transmitting, by the processing device, a second digital signal to the second lighting fixture to cause the second lighting fixture to generate light at a second CCT value based on the CCT level and the first maximum CCT value.

2. The method of claim 1, wherein the CCT level is below the first minimum CCT value and between the second minimum CCT value and the second maximum CCT value, further comprising:
   determining, by the processing device, that the second CCT value is below the CCT level.

3. The method of claim 1, wherein the CCT level is above the first maximum CCT value and between the second minimum CCT value and the second maximum CCT value, further comprising:
   determining, by the processing device, that the second CCT value is above the CCT level.

4. The method of claim 1, wherein the CCT level is above the first maximum CCT value and the second maximum CCT value, further comprising:
   determining, by the processing device, that the second CCT value is the second maximum CCT value.

5. The method of claim 1, wherein the CCT level is below the first minimum CCT value and the second minimum CCT value, further comprising:
   determining, by the processing device, that the second CCT value is the second minimum CCT value.

6. The method of claim 1, wherein the CCT level is above the first maximum CCT value, further comprising:
  determining, by the processing device, that the second CCT value is set to the first maximum CCT value.

7. The method of claim 1, wherein the CCT level is below the first minimum CCT value, further comprising:
  determining, by the processing device, that the second CCT value is set to the first minimum CCT value.

8. The method of claim 1, wherein the request to generate light at the CCT level is based, at least in part, on a condition detected by a sensor.

9. A method comprising:
  receiving, by a processing device, a sensor signal, wherein the sensor signal indicates a condition detected by a sensor;
  determining, by the processing device, a correlated color temperature ("CCT") level based on the condition detected by the sensor;
  determining, by the processing device, a target CCT level based on the CCT level, a second target CCT level for a second lighting fixture, and a CCT range for a first lighting fixture, wherein the first lighting fixture has a CCT range with a CCT range minimum and a CCT range maximum, wherein the target CCT level differs from the CCT level and is within the CCT range; and
  controlling, by the processing device, the first lighting fixture to cause the first lighting fixture to generate light at the target CCT level.

10. The method of claim 9, wherein the sensor is an occupancy sensor and the condition is occupancy, and prior to receiving the sensor signal, controlling, by the processing device, the first lighting fixture to cause the first lighting fixture to generate light at an unoccupied CCT level, and
  wherein determining, by the processing device, a CCT level based on the condition detected by the sensor comprises determining an occupied CCT level that differs from the unoccupied CCT level.

11. The method of claim 9, further comprising:
  receiving, by the processing device, a signal from a distributed light manager, wherein the signal indicates the second target CCT level determined by the distributed light manager for controlling the second lighting fixture based on the condition detected by the sensor.

12. The method of claim 9, wherein the sensor is a daylight sensor and the condition relates to at least one of intensity, color, or color temperature of ambient light, and wherein determining, by the processing device, a CCT level based on the condition detected by the sensor comprises comparing the condition to a threshold.

13. The method of claim 9, wherein the sensor is an occupancy sensor and the condition is an occupancy condition, further comprising:
  determining, by the processing device, an intensity level based on the occupancy condition; and
  controlling, by the processing device, the first lighting fixture to cause the first lighting fixture to generate light at the intensity level.

14. The method of claim 9, wherein the sensor is an occupancy sensor and the condition is an occupancy condition that indicates an occupancy level or an activity level, further comprising:
  adjusting, by the processing device, the target CCT level based on a number of occupants or the activity level of the occupants.

15. A method comprising:
  receiving, by a processing device, a request to generate light at a correlated color temperature ("CCT") level, wherein the processing device is associated with a first lighting fixture having a first range of generatable CCT values with a first minimum CCT value and a first maximum CCT value;
  determining, by the processing device, a first CCT value based on the request and the first range by:
    when the CCT level is below the first minimum CCT value, then the first CCT value is the first minimum CCT value;
    when the CCT level is above the first maximum CCT value, then the first CCT value is the first maximum CCT value;
    when the CCT level is between the first minimum CCT value and the first maximum CCT value and a second CCT value associated with a second lighting fixture and the request has been received, then the first CCT value is based on the CCT level, the second CCT value, the first minimum CCT value, and the first maximum CCT value; and
    when the CCT level is between the first minimum CCT value and the first maximum CCT value and the second CCT value associated with the second lighting fixture and the request has not been received, then the first CCT value is the CCT level; and
  controlling, by the processing device, the first lighting fixture to cause the first lighting fixture to generate light at the first CCT value.

16. The method of claim 15, wherein the CCT level is between the first minimum CCT value and the first maximum CCT value and a second CCT value associated with a second lighting fixture and the request has been received, further comprising:
  when the second CCT value is below the CCT level, then the first CCT value is above the CCT level; and
  when the second CCT value is above the CCT level, then the first CCT value is below the CCT level.

17. The method of claim 15, further comprising:
  receiving, by the processing device, a sensor signal that indicates a condition detected by the sensor; and
  adjusting, by the processing device, the first CCT value based on the condition detected by the sensor.

18. The method of claim 17, wherein the condition detected by the sensor relates to at least one of occupancy or an ambient light characteristic.

19. A first lighting fixture, comprising:
  a plurality of illuminating elements having a first range of generatable correlated color temperature ("CCT") values with a first minimum CCT value and a first maximum CCT value;
  a network communications port for communicating with a second lighting fixture; and
  a processing device, wherein the processing device is configured to:
    receive data related to a color temperature, wherein the data includes data related to a user input and data related to a CCT value associated with the second lighting fixture;
    determine a first CCT value based on the received data and the first range; and
    control the first lighting fixture so the illuminating elements generate light at the first CCT value.

20. The first lighting fixture of claim 19, wherein the processing device is further configured to determine the first CCT value by:
  when the user input indicates a CCT level above the first maximum CCT value, then the first CCT value is the first maximum CCT value;

when the user input indicates a CCT level below the first minimum CCT value, then the first CCT value is the first minimum CCT value; and when the user input indicates a CCT level within the first range, then the first CCT value is based on the CCT level and the CCT value associated with the second lighting fixture.

21. The first lighting fixture of claim 20, wherein the user input indicates a CCT level within the first range, and the processing device is further configured to determine the first CCT value by:

when the CCT value associated with the second lighting fixture is above a CCT level indicated by the user input, then the first CCT value is below the CCT level indicated by the user input; and when the CCT value associated with the second lighting fixture is below the CCT level indicated by the user input, then the first CCT value is above the CCT level indicated by the user input.

22. The first lighting fixture of claim 19, wherein the network communications port is further configured for communication with an occupancy sensor, and wherein the processing device is further configured to:

determine an intensity value based on an occupancy condition sensed by the occupancy sensor; and control the first lighting fixture so the illuminating elements generate light at the intensity value.

23. The first lighting fixture of claim 19, wherein the network communications port is further configured for communication with an occupancy sensor, and wherein the processing device is further configured to:

adjust the first CCT value based on an occupancy condition sensed by the occupancy sensor.

* * * * *